(12) United States Patent
Tang et al.

(10) Patent No.: US 9,076,474 B1
(45) Date of Patent: Jul. 7, 2015

(54) DATA STORAGE DEVICE ATTENUATING THERMAL DECAY EFFECT ON FLY HEIGHT MEASUREMENT

(71) Applicant: Western Digital Technologies, Inc., Irvine, CA (US)

(72) Inventors: Kathy X. Tang, San Jose, CA (US); Jerry G. Le, Milpitas, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/582,004

(22) Filed: Dec. 23, 2014

(51) Int. Cl.
*G11B 5/60* (2006.01)

(52) U.S. Cl.
CPC .................. *G11B 5/6029* (2013.01)

(58) Field of Classification Search
None
See application file for complete search history.

(56) References Cited

U.S. PATENT DOCUMENTS

| | | | |
|---|---|---|---|
| 4,931,887 A * | 6/1990 | Hegde et al. .................. 360/75 |
| 5,912,791 A * | 6/1999 | Sundaram et al. ............ 360/135 |
| 5,991,104 A * | 11/1999 | Bonyhard ...................... 360/15 |
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,086,961 A * | 7/2000 | Bonyhard ...................... 427/547 |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |

(Continued)

*Primary Examiner* — Peter Vincent Agustin

(57) ABSTRACT

A data storage device is disclosed comprising a head actuated over a disk. A first spacing pattern is written to the disk and a second spacing pattern is written to the disk different from the first spacing pattern. A first fly height measurement (FHM1_1) is generated by reading the first spacing pattern and a first fly height measurement (FHM2_1) is generated by reading the second spacing pattern. After an interval, a second fly height measurement (FHM1_2) is generated by reading the first spacing pattern and a second fly height measurement (FHM2_2) is generated by reading the second spacing pattern. A change in the fly height of the head is estimated based on:

$$(\Delta FHM2 - B \cdot \Delta FHM1)/(A-B)$$

where $\Delta FHM1$ represents a difference between FHM1_1 and FHM1_2, $\Delta FHM2$ represents a difference between FHM2_1 and FHM2_2, and A and B are constants.

8 Claims, 5 Drawing Sheets

(56) References Cited

U.S. PATENT DOCUMENTS

| | | |
|---|---|---|
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,574,754 B1 * | 6/2003 | Smith ............... 714/47.2 |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,775,089 B1 * | 8/2004 | Bonin et al. ............ 360/75 |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,987,630 B1 | 1/2006 | Higgins et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |

(56) References Cited

U.S. PATENT DOCUMENTS

| | | |
|---|---|---|
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,532 B1 * | 8/2006 | Krajnovich et al. ............ 360/25 |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,209,304 B2 | 4/2007 | Seng et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |

(56) References Cited

U.S. PATENT DOCUMENTS

| | | | |
|---|---|---|---|
| 8,271,692 B1 | 9/2012 | Dinh et al. | |
| 8,279,550 B1 | 10/2012 | Hogg | |
| 8,281,218 B1 | 10/2012 | Ybarra et al. | |
| 8,285,923 B2 | 10/2012 | Stevens | |
| 8,289,656 B1 | 10/2012 | Huber | |
| 8,295,002 B1 * | 10/2012 | Katchmart | 360/48 |
| 8,305,705 B1 | 11/2012 | Roohr | |
| 8,307,156 B1 | 11/2012 | Codilian et al. | |
| 8,310,775 B1 | 11/2012 | Boguslawski et al. | |
| 8,315,006 B1 | 11/2012 | Chahwan et al. | |
| 8,316,263 B1 | 11/2012 | Gough et al. | |
| 8,320,067 B1 | 11/2012 | Tsai et al. | |
| 8,324,974 B1 | 12/2012 | Bennett | |
| 8,332,695 B2 | 12/2012 | Dalphy et al. | |
| 8,339,919 B1 | 12/2012 | Lee | |
| 8,341,337 B1 | 12/2012 | Ong et al. | |
| 8,350,628 B1 | 1/2013 | Bennett | |
| 8,356,184 B1 | 1/2013 | Meyer et al. | |
| 8,370,683 B1 | 2/2013 | Ryan et al. | |
| 8,375,225 B1 | 2/2013 | Ybarra | |
| 8,375,274 B1 | 2/2013 | Bonke | |
| 8,380,922 B1 | 2/2013 | DeForest et al. | |
| 8,390,948 B2 | 3/2013 | Hogg | |
| 8,390,952 B1 | 3/2013 | Szeremeta | |
| 8,392,689 B1 | 3/2013 | Lott | |
| 8,407,393 B1 | 3/2013 | Yolar et al. | |
| 8,413,010 B1 | 4/2013 | Vasquez et al. | |
| 8,417,566 B2 | 4/2013 | Price et al. | |
| 8,421,663 B1 | 4/2013 | Bennett | |
| 8,422,172 B1 | 4/2013 | Dakroub et al. | |
| 8,427,770 B1 | 4/2013 | O'Dell et al. | |
| 8,427,771 B1 | 4/2013 | Tsai | |
| 8,429,343 B1 | 4/2013 | Tsai | |
| 8,433,937 B1 | 4/2013 | Wheelock et al. | |
| 8,433,977 B1 | 4/2013 | Vasquez et al. | |
| 8,441,909 B1 | 5/2013 | Thayamballi et al. | |
| 8,456,980 B1 | 6/2013 | Thayamballi | |
| 8,458,526 B2 | 6/2013 | Dalphy et al. | |
| 8,462,466 B2 | 6/2013 | Huber | |
| 8,467,151 B1 | 6/2013 | Huber | |
| 8,483,027 B1 | 7/2013 | Mak et al. | |
| 8,489,841 B1 | 7/2013 | Strecke et al. | |
| 8,493,679 B1 | 7/2013 | Boguslawski et al. | |
| 8,499,198 B1 | 7/2013 | Messenger et al. | |
| 8,514,506 B1 | 8/2013 | Li et al. | |
| 8,554,741 B1 | 10/2013 | Malina | |
| 8,560,759 B1 | 10/2013 | Boyle et al. | |
| 8,576,509 B1 | 11/2013 | Hogg | |
| 8,576,511 B1 | 11/2013 | Coker et al. | |
| 8,578,100 B1 | 11/2013 | Huynh et al. | |
| 8,578,242 B1 | 11/2013 | Burton et al. | |
| 8,582,223 B1 | 11/2013 | Garani et al. | |
| 8,582,231 B1 | 11/2013 | Kermiche et al. | |
| 8,589,773 B1 | 11/2013 | Wang et al. | |
| 8,593,753 B1 | 11/2013 | Anderson | |
| 8,599,512 B2 | 12/2013 | Hogg | |
| 8,605,379 B1 | 12/2013 | Sun | |
| 8,611,031 B1 | 12/2013 | Tan et al. | |
| 8,611,032 B2 | 12/2013 | Champion et al. | |
| 8,612,798 B1 | 12/2013 | Tsai | |
| 8,619,383 B1 | 12/2013 | Jung et al. | |
| 8,619,508 B1 | 12/2013 | Krichevsky et al. | |
| 8,619,529 B1 | 12/2013 | Liew et al. | |
| 8,621,115 B1 | 12/2013 | Bombet et al. | |
| 8,621,133 B1 | 12/2013 | Boyle | |
| 8,625,224 B1 | 1/2014 | Lin et al. | |
| 8,625,225 B1 | 1/2014 | Wang | |
| 8,626,463 B2 | 1/2014 | Stevens et al. | |
| 8,630,052 B1 | 1/2014 | Jung et al. | |
| 8,631,188 B1 | 1/2014 | Heath et al. | |
| 8,635,412 B1 | 1/2014 | Wilshire | |
| 8,654,466 B1 | 2/2014 | McFadyen | |
| 8,661,193 B1 | 2/2014 | Cobos et al. | |
| 8,665,547 B1 | 3/2014 | Yeo et al. | |
| 8,667,248 B1 | 3/2014 | Neppalli | |
| 8,670,205 B1 | 3/2014 | Malina et al. | |
| 8,671,250 B2 | 3/2014 | Lee | |
| 8,681,442 B2 | 3/2014 | Hogg | |
| 8,681,445 B1 | 3/2014 | Kermiche et al. | |
| 8,683,295 B1 | 3/2014 | Syu et al. | |
| 8,687,306 B1 | 4/2014 | Coker et al. | |
| 8,687,307 B1 | 4/2014 | Patton, III | |
| 8,687,313 B2 | 4/2014 | Selvaraj | |
| 8,693,133 B1 | 4/2014 | Lee et al. | |
| 8,698,492 B1 | 4/2014 | Mak et al. | |
| 8,699,171 B1 | 4/2014 | Boyle | |
| 8,699,172 B1 | 4/2014 | Gunderson et al. | |
| 8,711,500 B1 | 4/2014 | Fong et al. | |
| 8,711,506 B1 | 4/2014 | Giovenzana et al. | |
| 8,711,665 B1 | 4/2014 | Abdul Hamid | |
| 8,717,694 B1 | 5/2014 | Liew et al. | |
| 8,717,695 B1 | 5/2014 | Lin et al. | |
| 8,730,610 B2 | 5/2014 | McFadyen et al. | |
| 8,730,612 B1 | 5/2014 | Haralson | |
| 8,743,502 B1 | 6/2014 | Bonke et al. | |
| 8,749,911 B1 | 6/2014 | Sun et al. | |
| 8,753,146 B1 | 6/2014 | Szeremeta et al. | |
| 8,755,136 B1 | 6/2014 | Ng et al. | |
| 8,756,361 B1 | 6/2014 | Carlson et al. | |
| 8,760,782 B1 | 6/2014 | Garani et al. | |
| 8,760,792 B1 | 6/2014 | Tam | |
| 8,769,593 B1 | 7/2014 | Schwartz et al. | |
| 8,773,793 B1 | 7/2014 | McFadyen | |
| 8,773,802 B1 | 7/2014 | Anderson et al. | |
| 8,773,807 B1 * | 7/2014 | Chia et al. | 360/75 |
| 8,773,957 B1 | 7/2014 | Champion et al. | |
| 8,780,470 B1 | 7/2014 | Wang et al. | |
| 8,782,334 B1 | 7/2014 | Boyle et al. | |
| 8,786,976 B1 | 7/2014 | Kang et al. | |
| 8,787,125 B1 | 7/2014 | Lee | |
| 8,792,196 B1 | 7/2014 | Lee | |
| 8,792,200 B1 | 7/2014 | Tam et al. | |
| 8,797,667 B1 | 8/2014 | Barlow et al. | |
| 8,799,977 B1 | 8/2014 | Kapner, III et al. | |
| 8,817,413 B1 | 8/2014 | Knigge et al. | |
| 8,817,584 B1 | 8/2014 | Selvaraj | |
| 8,825,976 B1 | 9/2014 | Jones | |
| 8,825,977 B1 | 9/2014 | Syu et al. | |
| 8,922,939 B1 * | 12/2014 | Knigge et al. | 360/75 |
| 2002/0135939 A1 * | 9/2002 | Wada | 360/135 |
| 2002/0176185 A1 * | 11/2002 | Fayeulle et al. | 360/31 |
| 2003/0051097 A1 * | 3/2003 | Ottesen et al. | 711/112 |
| 2003/0204347 A1 * | 10/2003 | Smith | 702/82 |
| 2007/0121235 A1 * | 5/2007 | Sai et al. | 360/51 |
| 2007/0230013 A1 * | 10/2007 | Yokohata et al. | 360/75 |
| 2007/0268614 A1 * | 11/2007 | Henry et al. | 360/75 |
| 2007/0268615 A1 | 11/2007 | McFadyen et al. | |
| 2008/0165443 A1 | 7/2008 | Moline | |
| 2009/0113702 A1 | 5/2009 | Hogg | |
| 2010/0306551 A1 | 12/2010 | Meyer et al. | |
| 2011/0226729 A1 | 9/2011 | Hogg | |
| 2012/0159042 A1 | 6/2012 | Lott et al. | |
| 2012/0275050 A1 | 11/2012 | Wilson et al. | |
| 2012/0281963 A1 | 11/2012 | Krapf et al. | |
| 2012/0324980 A1 | 12/2012 | Nguyen et al. | |

* cited by examiner

DATA STORAGE DEVICE ATTENUATING THERMAL DECAY EFFECT ON FLY HEIGHT MEASUREMENT

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
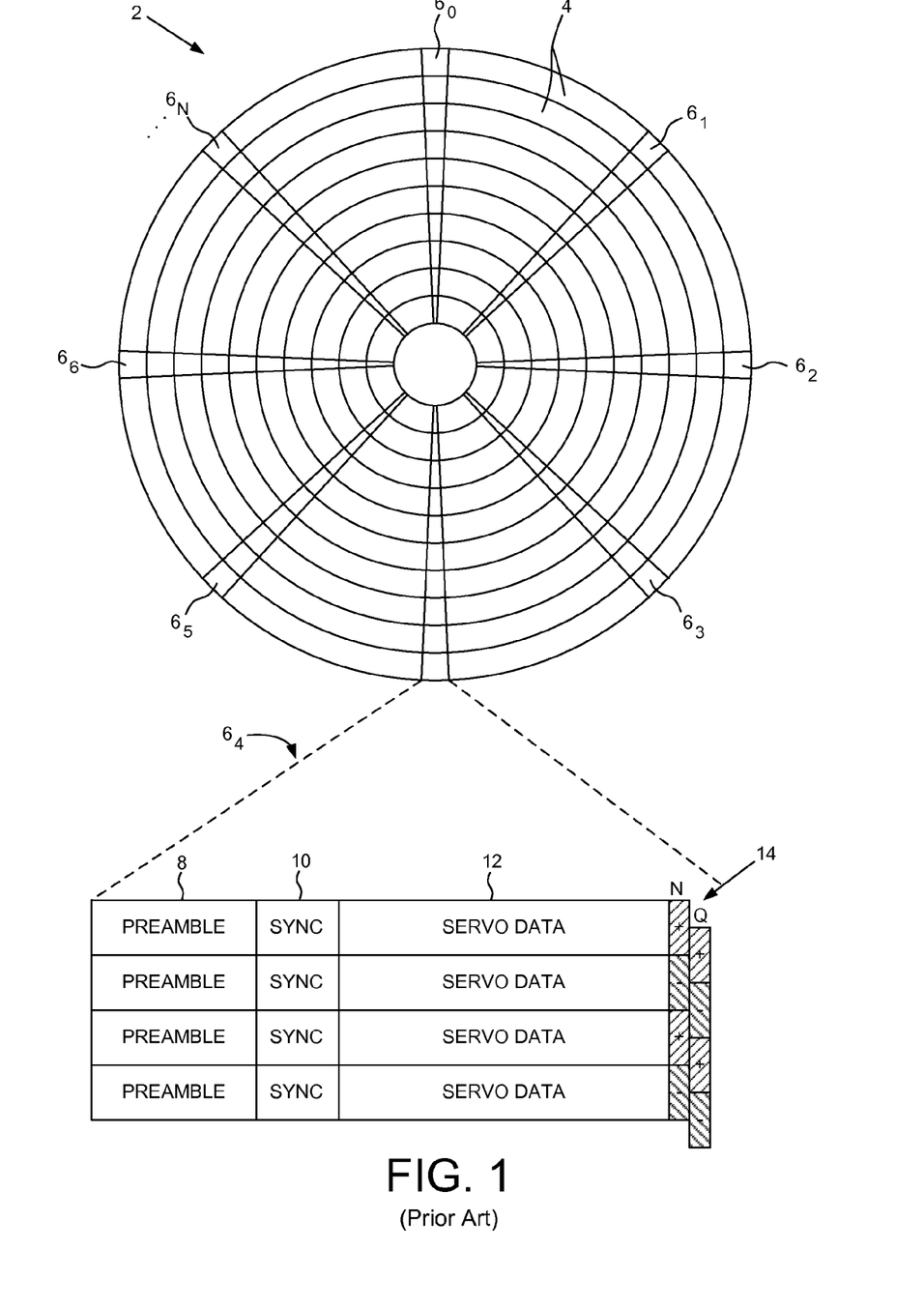
FIG. 1 shows a prior art disk format comprising servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator which controls the fly height through mechanical deflection. A dynamic fly height (DFH) servo controller may measure the fly height of the head and adjust the fly height actuator to maintain a target fly height during write/read operations.

DETAILED DESCRIPTION

Figure 2A:
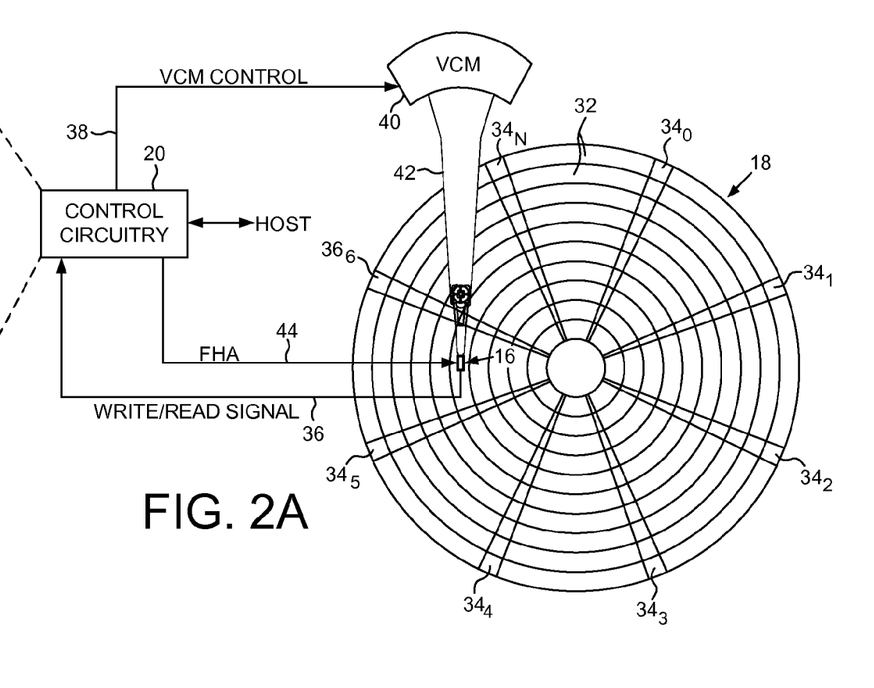
FIG. 2A shows a data storage device in the form of a disk drive according to an embodiment comprising a head actuated over a disk, and a fly height actuator (FHA) for controlling a fly height of the head over the disk.
Figure 2B:
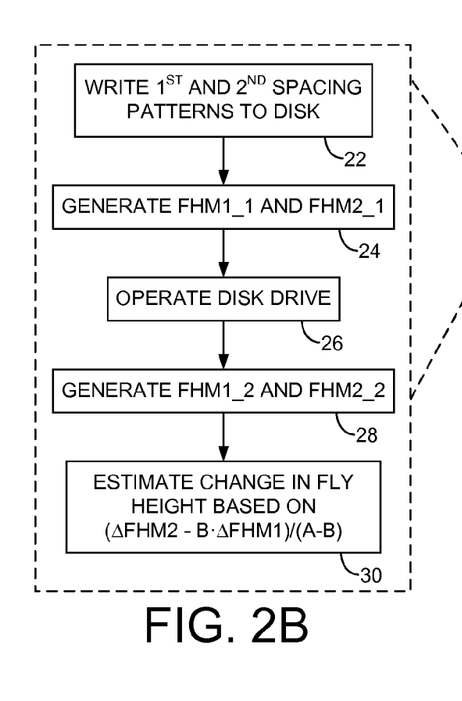
FIG. 2B is a flow diagram according to an embodiment for estimating a change in the fly height of the head in a manner that compensates for a thermal decay effect of a spacing pattern written on the disk.

FIG. 2A shows a data storage device in the form of a disk drive comprising a head 16 actuated over a disk 18, and control circuitry 20 configured to execute the flow diagram of FIG. 2B. A first spacing pattern is written to the disk and a second spacing pattern is written to the disk different from the first spacing pattern (block 22). A first fly height measurement (FHM1_1) is generated by reading the first spacing pattern and a first fly height measurement (FHM2_1) is generated by reading the second spacing pattern (block 24). After an interval (block 26), a second fly height measurement (FHM1_2) is generated by reading the first spacing pattern and a second fly height measurement (FHM2_2) is generated by reading the second spacing pattern (block 28). A change in the fly height of the head is estimated (block 30) based on:

$$(\Delta FHM2 - B \cdot \Delta FHM1)(A-B)$$

where $\Delta FHM1$ represents a difference between FHM1_1 and FHM1_2, $\Delta FHM2$ represents a difference between FHM2_1 and FHM2_2, and A and B are constants.

In the embodiment of FIG. 2A, the disk 18 comprises a plurality of servo tracks 32 defined by servo sectors $34_0$-$34_N$, wherein data tracks are defined relative to the servo tracks at the same or different radial density. The control circuitry 20 processes a read signal 36 emanating from the head 16 to demodulate the servo sectors $34_0$-$34_N$ and generate a position error signal (PES) representing an error between the actual position of the head and a target position relative to a target track. The control circuitry 20 filters the PES using a suitable compensation filter to generate a control signal 38 applied to a voice coil motor (VCM) 40 which rotates an actuator arm 42 about a pivot in order to actuate the head 16 radially over the disk 18 in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern.

In the embodiment of FIG. 2A, the head 16 comprises a suitable fly height actuator (FHA) configured to control a fly height of the head 16 over the disk 18. Any suitable fly height actuator may be employed, such as a piezoelectric actuator that actuates through mechanical deflection, or a heater that actuates through thermal expansion. In one embodiment, it may be desirable to maintain the fly height of the head 16 at a target fly height during access operations (write/read) so as to optimize the recording quality and detection accuracy of the disk drive. Accordingly, the fly height of the head 16 may be measured and an FHA setting 44 (e.g., voltage or current) applied to the FHA of the head 16 may be adjusted until the measured fly height substantially equals a target fly height.

In one embodiment, the fly height measurement (FHM) may be computed using a harmonic ratio technique (Wallace spacing equation) that measures an absolute head-media spacing according to the ratio of the amplitude of the read signal at two different harmonics while reading a spacing pattern from the disk 18 (e.g., a test pattern or a pattern recorded in a servo sector). In one embodiment, this harmonic ratio can be generated by reading a spacing pattern at two different frequencies (e.g., a 2T and 4T pattern). However, for a given fly height of the head the FHM generated based on the harmonic ratio equation will change over time due to the spacing pattern degrading (referred to as thermal decay). Accordingly, in one embodiment the FHM is generated in a manner that compensates for the degradation of the spacing pattern over time.

Figure 3A:
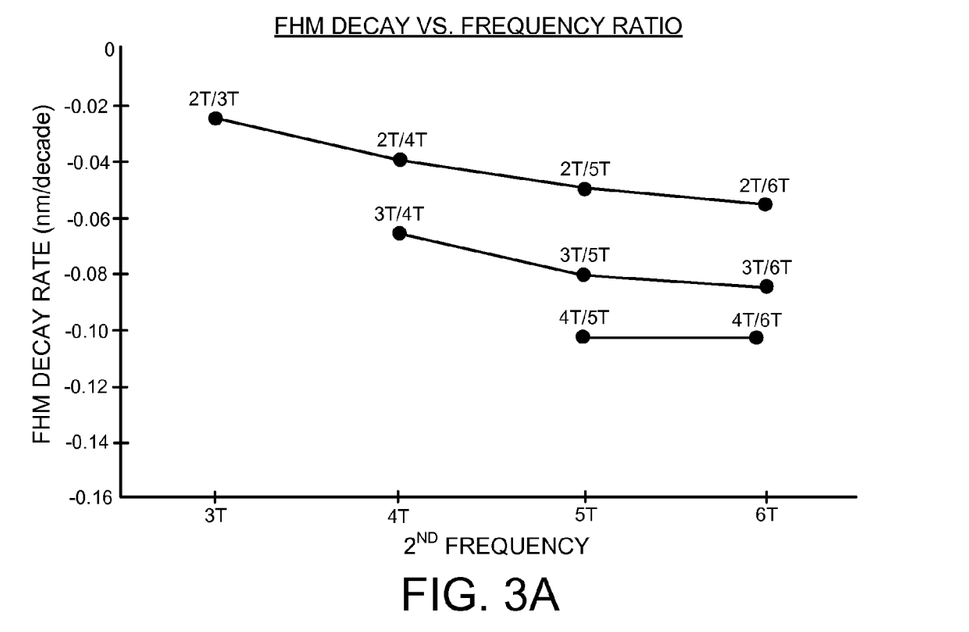
FIG. 3A illustrates a thermal decay rate of different frequency spacing patterns according to an embodiment.

In one embodiment, the change in the FHM over time may vary depending on the frequency of the spacing pattern due to a varying rate of thermal decay at different frequencies of the spacing pattern. This embodiment is illustrated in FIG. 3A wherein the FHM decay rate may increase as the frequency of the spacing pattern increases. In one embodiment, a FHM may be generated for two spacing patterns written at different frequencies (e.g., 2T/4T and 2T/6T) and the result used to generate a final FHM that compensates for the thermal decay of the spacing patterns.

Figure 3B:
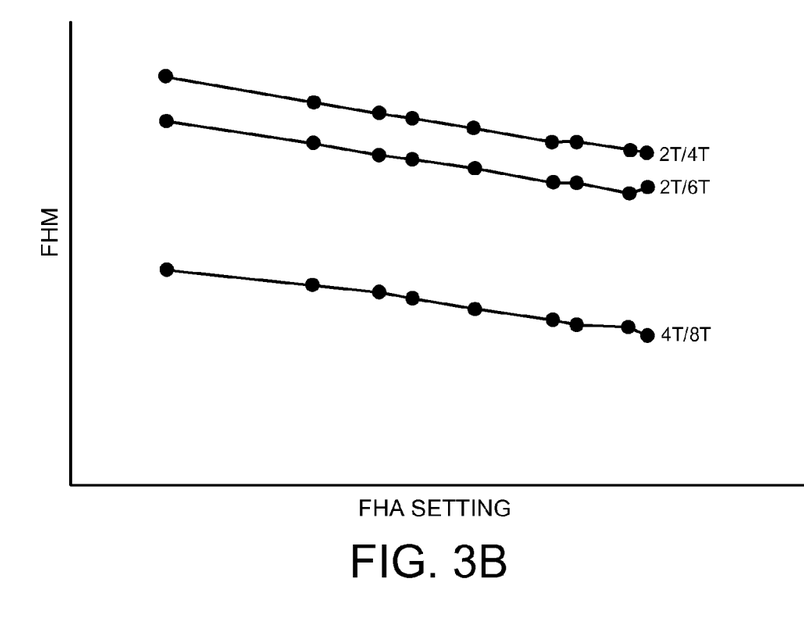
FIG. 3B illustrates FHA actuation curves for different frequency spacing patterns according to an embodiment.
Figure 3C:
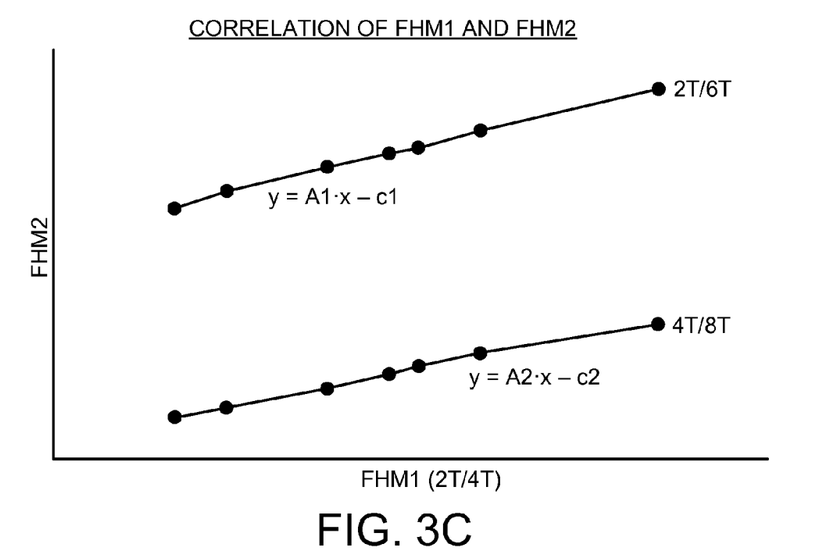
FIG. 3C illustrates an embodiment for generating a first constant for an equation that estimates the change in fly height of the head according to an embodiment.

In one embodiment, for a given fly height of the head, the FHM generated based on the harmonic ratio technique may also vary based on the frequency of the spacing pattern used to generate the FHM. This embodiment is illustrated in FIG. 3B which shows actuation curves for different spacing patterns, wherein the x-axis represents different FHA settings corresponding to different physical fly heights for the head and the y-axis represents the corresponding FHM generated for different frequency spacing patterns. The actuation curves shown in FIG. 3B may be converted into a correlation of FHM for two different spacing patterns as shown in FIG. 3C. That is, for two different frequency spacing patterns (e.g., 2T/4T and 2T/6T) a constant A may be computed representing a linear correlation between the FHM generated for each spacing pattern. This constant A may be used to represent a relationship between the change in FHM for the spacing patterns relative to a physical change d in the fly height of the head:

$$\Delta FHM2(d) = A \cdot \Delta FHM1(d) \qquad \text{Eq. (1)}$$

Figure 3D:
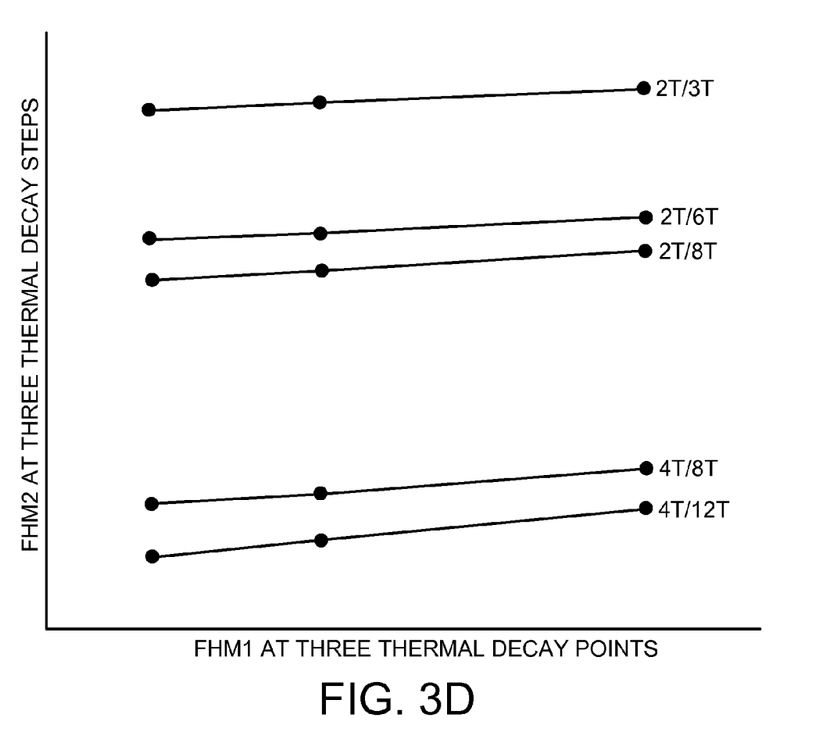
FIG. 3D illustrates an embodiment for generating a second constant for the equation that estimates the change in fly height of the head according to an embodiment.

A similar correlation between the thermal decay impact on the FHM computed for two different frequency spacing patterns may be generated by measuring the FHM for each frequency spacing pattern at different intervals. An example of this embodiment is illustrated in FIG. 3D wherein an FHM is generated at three different intervals for five different frequency spacing patterns. From these measurements, a linear relationship may be generated between the thermal decay impact on the FHM generated for two different frequency spacing patterns relative to time t for the same physical fly height of the head:

$$FHM2\_TD(t) = B \cdot FHM1\_TD(t) \qquad \text{Eq. (2)}$$

From the above equations (1) and (2), when the FHM changes due to a physical change d in the fly height of the head as well as due to thermal decay of the spacing pattern over time t, the following relationships may be derived:

$$\Delta FHM1(d,t) = \Delta FHM1(d) + FHM1\_TD(t)$$

$$\Delta FHM2(d,t) = \Delta FHM2(d) + FHM2\_TD(t)$$

$$\Delta FHM2(d,t) = A \cdot \Delta FHM1(d) + B \cdot FHM1\_TD(t) \qquad \text{Eq. (3)}$$

From the above equation (3), a change in the fly height of the head may be estimated in a manner that compensates for the thermal decay of the spacing patterns based on:

$$\Delta FHM1(d) = (\Delta FHM2 - B \cdot \Delta FHM1)/(A - B) \qquad \text{Eq. (4)}$$

That is, when the physical fly height of the head changes by d, in one embodiment the change in the FHM may be measured based on the change in the FHM generated for the first spacing pattern ΔFHM1 and the change in the FHM generated for the second spacing pattern ΔFHM2 which are input to the above equation (4), wherein the resulting estimate of the change in FHM takes into account the impact that thermal decay has on the spacing patterns.

Figure 4:
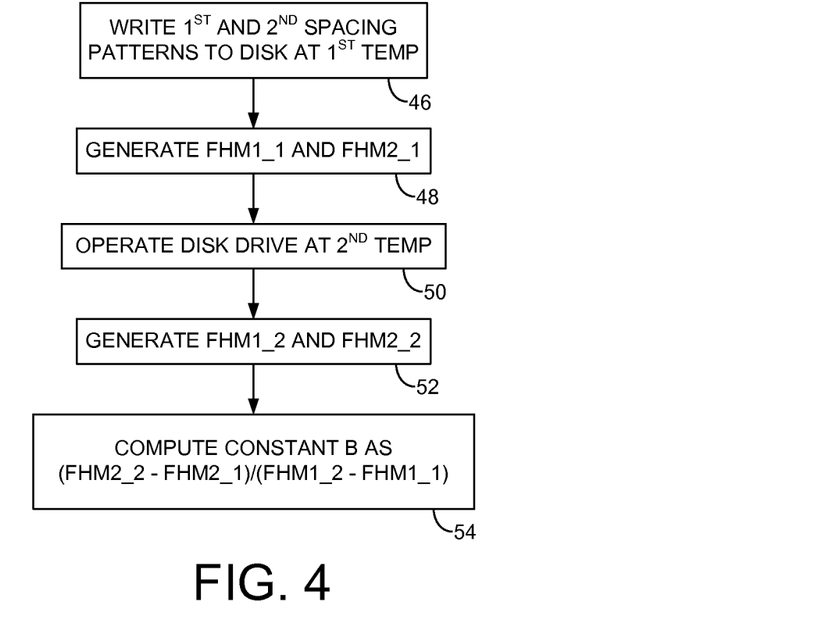
FIG. 4 is a flow diagram according to an embodiment for generating the second constant.

FIG. 4 is a flow diagram according to an embodiment for generating the constant B in the above equation (4). At a first operating temperature T1, the first spacing pattern and the second spacing pattern are written to the disk (block 46) and a first fly height measurement (FHM1_T1) is generated by reading the first spacing pattern and a first fly height measurement (FHM2_T1) is generated by reading the second spacing pattern (block 48). After generating FHM1_T1 and FHM2_T1, the operating temperature of the disk drive is increased to T2 and the disk drive is operated at the increased temperature T2 for a period of time (block 50), such as a period of hours, in order to enhance the thermal decay effect of the spacing patterns. After the interval at the second temperature T2, a second fly height measurement (FHM1_T2) is generated by reading the first spacing pattern and a second fly height measurement (FHM2_T2) is generated by reading the second spacing pattern (block 52). The B constant is then generated at block 54 according to:

$$B = (FHM2\_T2 - FHM2\_T1)/(FHM1\_T2 - FHM1\_T1).$$

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head; and
   control circuitry configured to:
      write a first spacing pattern to the disk;
      write a second spacing pattern to the disk different from the first spacing pattern;
      generate a first fly height measurement (FHM1_1) by reading the first spacing pattern and generate a first fly height measurement (FHM2_1) by reading the second spacing pattern;
      after an interval, generate a second fly height measurement (FHM1_2) by reading the first spacing pattern and generate a second fly height measurement (FHM2_2) by reading the second spacing pattern; and
      estimate a change in the fly height of the head based on:

$$(\Delta FHM2 - B \cdot \Delta FHM1)/(A-B)$$

where:
      $\Delta FHM1$ represents a difference between FHM1_1 and FHM1_2;
      $\Delta FHM2$ represents a difference between FHM2_1 and FHM2_2; and
      A and B are constants.

2. The data storage device as recited in claim 1, further comprising a fly height actuator (FHA) configured to adjust a fly height of the head over the disk based on an FHA setting, wherein the control circuitry is further configured to generate the A constant by:
   generating a first actuation curve for the first spacing pattern by generating fly height measurements over a range of FHA settings;
   generating a second actuation curve for the second spacing pattern by generating fly height measurements over a range of FHA settings; and
   evaluating a relationship between the first actuation curve and the second actuation curve.

3. The data storage device as recited in claim 2, wherein the control circuitry is further configured to generate the relationship by curve fitting data points of the first and second actuation curves to generate:

$$FHM2 = A \cdot FHM1 + C$$

where FHM2 represents a fly height measurement corresponding to the second spacing pattern computed as a function of the fly height measurement FHM1 corresponding to the first fly height pattern, and C is a constant.

4. The data storage device as recited in claim 1, wherein the control circuitry is further configured to generate the B constant by:
   at a first operating temperature T1, generating a first fly height measurement (FHM1_T1) by reading the first spacing pattern and generate a first fly height measurement (FHM2_T1) by reading the second spacing pattern;
   after generating FHM1_T1 and FHM2_T1, increase the operating temperature of the data storage device to T2;
   after an interval at the second temperature T2, generating a second fly height measurement (FHM1_T2) by reading the first spacing pattern and generate a second fly height measurement (FHM2_T2) by reading the second spacing pattern; and
   generating the B constant according to:

$$B = (FHM2\_T2 - FHM2\_T1)/(FHM1\_T2 - FHM1\_T1).$$

5. A method of operating a data storage device, the method comprising:
   writing a first spacing pattern to a disk;
   writing a second spacing pattern to the disk different from the first spacing pattern;
   generating a first fly height measurement (FHM1_1) by reading the first spacing pattern and generating a first fly height measurement (FHM2_1) by reading the second spacing pattern;
   after an interval, generating a second fly height measurement (FHM1_2) by reading the first spacing pattern and generating a second fly height measurement (FHM2_2) by reading the second spacing pattern; and
   estimating a change in the fly height of a head over the disk based on:

$$(\Delta FHM2 - B \cdot \Delta FHM1)/(A-B)$$

where:
      $\Delta FHM1$ represents a difference between FHM1_1 and FHM1_2;
      $\Delta FHM2$ represents a difference between FHM2_1 and FHM2_2; and
      A and B are constants.

6. The method as recited in claim 5, further comprising generating the A constant by:
   generating a first actuation curve for the first spacing pattern by generating fly height measurements over a range of FHA settings;
   generating a second actuation curve for the second spacing pattern by generating fly height measurements over a range of FHA settings; and evaluating a relationship between the first actuation curve and the second actuation curve.

7. The method as recited in claim 6, further comprising generating the relationship by curve fitting data points of the first and second actuation curves to generate:

$$FHM2 = A \cdot FHM1 + C$$

where FHM2 represents a fly height measurement corresponding to the second spacing pattern computed as a function of the fly height measurement FHM1 corresponding to the first fly height pattern, and C is a constant.

8. The method as recited in claim 5, further comprising generating the B constant by:
- at a first operating temperature T1, generating a first fly height measurement (FHM1_T1) by reading the first spacing pattern and generate a first fly height measurement (FHM2_T1) by reading the second spacing pattern;
- after generating FHM1_T1 and FHM2_T1, increase the operating temperature of the data storage device to T2;
- after an interval at the second temperature T2, generating a second fly height measurement (FHM1_T2) by reading the first spacing pattern and generate a second fly height measurement (FHM2_T2) by reading the second spacing pattern; and
- generating the B constant according to:

$$B = (FHM2\_T2 - FHM2\_T1)/(FHM1\_T2 - FHM1\_T1).$$

* * * * *